United States Patent Office 2,903,444
Patented Sept. 8, 1959

2,903,444

ACYL DERIVATIVES OF 4,6-DIHYDROXY-ISOPHTHALIC ACID

Ernst Schraufstatter and Werner Grab, Wuppertal-Elberfeld, Germany, assignors to Schenley Industries, Inc., New York, N.Y., a corporation No Drawing. Application March 28, 1957
Serial No. 649,008

Claims priority, application Germany April 27, 1956

6 Claims. (Cl. 260—211)

This invention relates to and has, as its object, the production of novel acyl derivatives of 4,6-dihydroxy isophthalic acid which has been found to constitute therapeutically valuable compounds exhibiting analgesic antiarthritic, antiinflammatory, and antipyretic activity.

The novel acyl derivatives of the 4,6-dihydroxy isophthalic acid in accordance with the invention has the general formula

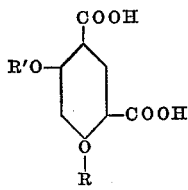

in which one of R and R' is a lower acyl radical and preferably an acetyl radical and the other is hydrogen or a lower acyl radical, preferably an acetyl radical. When R and R' both represent acyl radicals the same may represent the same or different acyl radicals.

The novel isophthalic acid derivatives, in accordance with the invention, may be obtained by reacting 4,6-dihydroxy isophthalic acid or a salt thereof with an acylation agent in the conventional manner. The mono or di-acyl derivatives are obtained, depending upon the quantity of the acylation agent used. For the production of the di-acyl derivatives the reaction may be effected stepwise and thus the second acyl radical may be different from the first.

Examples of suitable acylation agents which may be used include: acid anhydrides, acid halides, other reactive acid derivatives of lower aliphatic acids or ketene.

The reaction may be effected in the presence of an inert organic solvent, as for example, ether, benzene, chloroform, etc. If an acid anhydride is used as the acylation agent it is often desirable to add small quantities of a catalytically effective material such as pyridine, zinc chloride or sulfuric acid. If the acylation is effected in the presence of tertiary bases such as pyridine or dialkylaniline, these bases may be simultaneously used as solvent. The reaction may be effected at room temperature with moderate to strong cooling or may be effected at elevated temperatures.

The monoacyl derivatives of the 4,6-dihydroxy isophthalic acid in accordance with the invention may also be obtained by partial saponification of the 4,6-diacyloxy isophthalic acids.

The novel compounds, in accordance with the invention, are considerably better tolerated than acetylsalicyclic acid (aspirin) while exhibiting an at least equivalent analgesic antiarthritic and antipyretic effect.

The compounds may be administered as such or in the form of their salts with suitable inorganic or organic bases, as for example, in tablet or powder form per os.

Examples of salts of compounds, in accordance with the invention, include the alkali metal salts, calcium salts, salts of ethanolamine and methyl glucamine salts.

The salts are formed by dissolving the acid in ethanol and by adding the calculated amount of the corresponding base.

The compounds as such, or in the form of their salts, are preferably administered in tablet form. The tablet may be produced in the conventional tabletting machines and it has been found preferable to add acid binding agents such as calcium carbonate, aluminum hydroxide gel or the like to the tabletting mixtures.

The following examples are given by way of illustration and not limitation:

Example 1

20 g. of 4,6-dihydroxyisophthalic acid is heated with 70 cc. of acetic anhydride and several drops of pyridine to 50° C. with stirring. Dissolution starts gradually, and shortly thereafter the 4,6-diacetoxy-isophthalic acid precipitates in the form of crystals. Benzene is added to the reaction mixture, which is then filtered by suction and washed with benzene. The 4,6-diacetoxy-isophthalic acid obtained melts with decomposition at 153°, and has the formula:

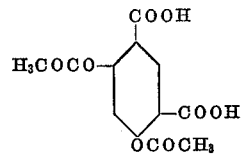

Example 2

10 g. of 4,6-dihydroxyisophthalic acid is dissolved in 10 cc. of dimethyl formamide and 30 cc. of acetone. After addition of several drops of pyridine, 5 cc. of acetic anhydride dissolved in 10 cc. of acetone is added dropwise while stirring at 60° C. Heating for a considerable period of time to 60° ensues. After cooling the 4-acetoxy-6-hydroxyisophthalic acid is precipitated by addition of water. It is separated and carefully dried. The melting point is 250–260°, and its formula is:

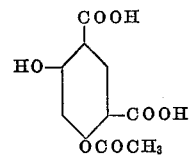

Example 3

The 4,6-diacetoxyisophthalic acid of Example 1 was dissolved in ethanol and the stoichiometric required quantity of calcium hydroxide for neutralization was added. This resulted in the formation of the corresponding calcium salt. In the same manner, alkali metal salts, salts of ethanol amine or methyl glucamine could be produced. These salts could also be obtained from the 4-acetoxy-6-hydroxyisophthalic acid of Example 2 in the identical manner.

Example 4

Male rats of an average weight of 150 grams were divided into a test group and control group comprising ten animals in each group. The test group was administered 25 to 50 mgm. of 4,6-diacetoxy-isophthalic acid. A further test group of ten animals was administered the same quantity of acetyl salicyclic acid. Two hours after the administration all of the rats of the test and control groups were injected intraperitoneally with 2 milliliters of native egg albumen. Within the next few hours, a typical edema developed at the paws and other parts of the rats, the size of which was determined for each of the groups. The size of the edema in the test group administered the 4,6-diacetoxy isophthalic acid was 90–69% smaller than that of the control group and was smaller than the other test group administered the acetyl salicyclic acid.

Similar results were obtained with edema from dextran injections and from ultra violet light erythema caused in guinea pigs by irradiating the cleanly shaven back skin of albino guinea pigs with ultra violet light for about ten minutes.

In toxicity tests, the toxicity of acetyl salicyclic acid was found to be more than three times that of the isophthalic acid derivatives in accordance with the invention.

We claim:

1. A member selected from the group consisting of isophthalic acid derivatives having the general formula

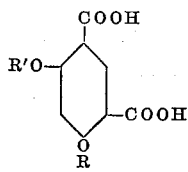

in which one of R and R' is a lower acyl radical and the other a member selected from the group consisting of H and lower acyl radicals, and non-toxic salts of said compounds.

2. A member selected from the group consisting of isophthalic acid derivatives having the general formula

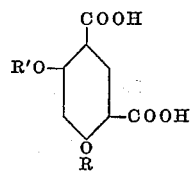

in which one of R and R' is the acetyl radical and the other a member selected from the group consisting of hydrogen and the acetyl radical and non-toxic salts of said compounds.

3. 4,6-diacetoxy-isophthalic acid.
4. A non-toxic salt of 4,6-diacetoxy-isophthalic acid.
5. 4-acetoxy-6-hydroxy-isophthalic acid.
6. A non-toxic salt of 4-acetoxy-6-hydroxy-isophthalic acid.

References Cited in the file of this patent

UNITED STATES PATENTS 1,140,716    Rietz ------------------ May 25, 1915

OTHER REFERENCES

Thiele et al.: Ann., vol. 349, p. 61 (1906).